United States Patent [19]

Mizobuchi

[11] Patent Number: 5,395,435
[45] Date of Patent: Mar. 7, 1995

[54] FAST DRYING DUPLICATING INK

[75] Inventor: Yoshikazu Mizobuchi, Des Plaines, Ill.

[73] Assignee: AB Dick Company, Chicago, Ill.

[21] Appl. No.: 237,644

[22] Filed: May 4, 1994

[51] Int. Cl.$^6$ .............................................. C09D 11/00
[52] U.S. Cl. .............................. 106/27 R; 106/28 R; 106/29 R; 106/477; 106/478
[58] Field of Search ................. 106/27 R, 28 R, 29 R, 106/477, 478

[56] References Cited

U.S. PATENT DOCUMENTS

| | | | |
|---|---|---|---|
| 2,839,412 | 6/1958 | Igler et al. | 106/29 R |
| 3,246,997 | 4/1966 | Sumner et al. | 106/26 R |
| 3,279,935 | 10/1966 | Daniell et al. | 106/478 |
| 3,421,910 | 1/1969 | Gilson et al. | 106/30 R |
| 3,620,792 | 11/1971 | Hagopian | 106/478 |
| 3,717,494 | 2/1973 | Jager et al. | 106/474 |
| 3,823,020 | 7/1974 | Gilson et al. | 106/30 B |
| 3,992,218 | 11/1976 | Suetsugu et al. | 106/478 |
| 4,879,335 | 11/1989 | Hirota et al. | 106/478 |
| 5,228,911 | 7/1993 | Kunii et al. | 106/478 |

*Primary Examiner*—Helene Klemanski
*Attorney, Agent, or Firm*—Leydig, Voit & Mayer, Ltd.

[57] ABSTRACT

An water-in-oil emulsion duplicating ink comprising a water phase comprising an aqueous dispersion of oxidized carbon black and an oil phase comprising a saturated oil and an unsaturated oil. The ink compositions of the present invention dry quickly, and exhibit minimal dispersion in the paper upon which the ink is applied. The ink compositions of the present invention remain liquid for extended periods of time upon exposure to the atmosphere.

22 Claims, No Drawings

FAST DRYING DUPLICATING INK

FIELD OF THE INVENTION

The present invention relates to duplicating inks, and more particularly to water-in-oil emulsion duplicating inks.

BACKGROUND OF THE INVENTION

Water-in-oil emulsion inks are formulated with an oil phase surrounding water phase droplets having a pigment, such as carbon black, dispersed therein. Such formulations are well-known in the art, and are disclosed, for example, in U.S. Pat. Nos. 2,839,412, 3,421,910, and 3,823,020.

Water-in-oil emulsion inks are generally used in digital duplicating processes. In those processes, the ink is introduced into a cylinder having a plurality of small holes. The cylinder is covered with a metal mesh, and a stencil is fixed upon the mesh. During the printing process, the ink penetrates through the holes in the cylinder onto the surface of a paper. The paper is held in contact with the cylinder by means of a platen roller.

The fibers of the paper have numerous small pores, which act to break down the two phases in the ink as the ink is absorbed into the paper. Generally, the oil phase is absorbed into the paper, and diffuses vertically and horizontally. The water in the water phase diffuses vertically and horizontally, and evaporates. The pigment particles remain on the paper surface until the water evaporates. At that time, the pigment particles are drawn from the paper surface into the paper by the oil. The drying oils (such as china-wood oil and aged linseed oil) form an oil film on the paper fibers and carbon black particles, and air oxidation of the drying oils then slowly occurs. The pigment particles absorb the oil, thus limiting the vertical and horizontal diffusion of the oil, and hence, the printed images. The diffusion of the oil containing the pigment particles is dependent upon both the time needed for the oil to dry, and the quality of the paper. The drying time for the oil is affected by the speed at which the oil is oxidized on the surface of the paper fibers by air. This process, however, is quite slow. Since the amount of diffusion relates directly to print quality, it is desirable to minimize diffusion.

To that end, various techniques have been tried to increase the rate at which water-in-oil emulsion inks dry upon application to a paper substrate. Surfactants have been added to the water phase of the ink compositions to reduce the surface tension of the water and thereby promote evaporation. The amount of low volatility liquids in the oil phase has been reduced. Drying agents have also been added to both the water-in-oil phases to increase the drying rate. However, conventional water-in-oil emulsion ink compositions, including those containing the above noted surfactants, reduced amounts of low volatility liquids, and drying agents, still exhibit slow drying times on various papers, as well as an unacceptable amount of pigment diffusion.

Thus, there exists a need for an water-in-oil emulsion ink composition that dries quickly and exhibits minimal pigment diffusion when printed on paper for varying qualities. There is also a need for an water-in-oil emulsion ink composition that exhibits improved stability.

SUMMARY OF THE INVENTION

The water-in-oil emulsion ink compositions of the present invention solve the problems associated with prior art water-in-oil emulsion inks, and achieve distinct advantages thereover. The ink compositions of the present invention comprise a water phase comprising water and a dispersion containing oxidized carbon black, and an oil phase comprising a saturated oil and an unsaturated oil. Preferably, the carbon black is oxidized in an aqueous dispersion. The water phase may also optionally contain a surfactant, while the oil phase may contain, in addition to the saturated and unsaturated oils, an emulsifier, a viscosity adjusting agent, a surfactant, and a varnish.

The ink compositions of the present invention dry quickly, and exhibit minimal dispersion in the paper upon which the ink is applied. The ink compositions of the present invention remain liquid for extended periods of time upon exposure to the atmosphere.

It is believed that the oxidized carbon black particles in the water phase contact the unsaturated oil in the oil phase shortly after the ink composition is applied to the paper. The oxidized carbon black particles in turn oxidize the unsaturated oil, causing crosslinking in the oil, and resulting in accelerated drying.

DESCRIPTION OF THE PREFERRED EMBODIMENTS

Water Phase Components
Carbon Black

Essentially any commercially available aqueous carbon black dispersion may be used in the ink compositions of the present invention. Preferably, the dispersion contains carbon black in an amount from about 20% to about 50% by weight of the dispersion and the dispersion has a pH from about 7 to about 10. Also, the particle size of the carbon black is preferably from about 13 nm to about 100 nm. Carbon black dispersions useful in the ink compositions of the present invention include Permablack 292 and Permablack 1180, available from Mono-Chem Corporation, and AJACK BLACK 3017 and AJACK BLACK 3018, available from Solution Dispersion, Inc. Permablack 292 is preferred.

The amount of oxidizing agent used must be sufficient to effect substantial oxidation of the carbon black surfaces. Generally, when hydrogen peroxide is used as the oxidizing agent, the aqueous carbon black dispersion is present in a weight ratio of dispersion to aqueous hydrogen peroxide solution of about 1:2 to about 1:2.75. A dispersion/aqueous hydrogen peroxide solution weight ratio of approximately 1:2.35 is preferred. On a total ink composition basis, the carbon black dispersion is generally present in a weight ratio of carbon black dispersion to ink composition of about 1:3.2 to about 1:7.8.

Oxidation of the Carbon Black

The carbon black in the aqueous dispersion can be oxidized by mixing the dispersion with an aqueous solution of hydrogen peroxide. The concentration of the hydrogen peroxide in the aqueous solution should be from about 3% to about 30% by weight of the aqueous solution, with an amount from about 3% to about 5% by weight being preferred. More stable ink compositions are achieved when lesser amounts of hydrogen peroxide are used. It has been found that use of a hydrogen peroxide concentration of approximately 2.3% by weight of the water phase without solids will effect substantial oxidation of the carbon black and will therefore provide inks that are quite stable and exhibit fast drying times.

The mixture of the aqueous carbon black dispersion and the aqueous hydrogen peroxide solution comprises the water phase of the ink compositions of the present invention. Once the carbon black dispersion and the aqueous hydrogen peroxide solution are mixed to oxidize the carbon black, it is preferred that the oxidized carbon black remain in an aqueous dispersion and is not allowed to dry. The oxidized carbon black surfaces have many active species, such as —COOH, or C—OO—CH$_3$, which are unstable when exposed to the atmosphere in the dry condition or when the environment temperature changes. Thus, changes in the temperature or in the environment are preferably also avoided.

To ensure sufficient oxidation of the carbon black, the mixture containing the carbon black and the hydrogen peroxide (i.e., the water phase) should be "aged" for a period of time ranging from 1 day to about 14 days prior to combination with the oil phase and use in printing operations. Increased aging time generally results in an ink composition having a faster drying time when applied to paper. Aging more than three (3) to six (6) days, however, provides only a marginal increase in drying time.

The carbon black in the dispersion may also be oxidized by pumping a mixture of a carbon black dispersion and deionized water (i.e., the water phase) through a vessel containing ozone. The mixing weight ratio of the carbon black dispersion to the deionized water is from about 1:2 to about 1:2.75, with a ratio of 1:2.35 being preferred.

Again, to ensure sufficient oxidation, the carbon black should be exposed to ozone for a time period ranging from about 1 hour to about 40 hours. The carbon black may be exposed to ozone for longer than 10 hours, but it is not believed that exposure beyond 10 hours causes any increase in drying rate.

Oil Phase
  Saturated Oil

Saturated oils are used in the inks of the present invention to prevent the ink from drying in the open air and to control ink viscosity. The saturated oils that are useful in the inks of the present invention include naphthenic saturated oils. The preferred saturated oil for use in the ink compositions of the present invention is available under the trademark Tufflo-2000, from EMCO Chemical Distributors, Inc.

Unsaturated Oil

Unsaturated oils useful in the ink compositions of the present invention include China-wood oil, aged linseed oil, and other known drying oils. To be useful, the unsaturated oil should have a high number of conjugated unsaturated carbon bonds. The amount of unsaturated oil to be used is determined based on the weight of the saturated oil used, and should be in the range from about 1% to about 20% by weight. An amount of unsaturated oil from about 5% to about 10% by weight of the saturated oil-unsaturated oil mixture is preferred. The amount of unsaturated oil may be adjusted within the above ranges by one skilled in the art to achieve a desired drying rate.

The saturated oil-unsaturated oil mixture should be present in the ink compositions of the present invention in a weight ratio of carbon black dispersion to saturated oil-unsaturated oil mixture of about 1:0.9 to about 1:2.25. A carbon black composition/saturated oil-unsaturated oil mixture weight ratio of 1:2 is preferred.

Other Oil Phase Components

A non-ionic emulsifier can also be used in the ink compositions of the present invention to keep the ink composition stable and to reduce the surface tension energy of the oil phase, thereby increasing the drying rate of the ink. Useful non-ionic emulsifiers include sorbitan monooleate, which is available from ICI-American, and sorbitan trioleate, available from Witco Chemical Company. Sorbitan monooleate is preferred. The emulsifier is usually present in a weight ratio of non-ionic emulsifier to the saturated and unsaturated oil mixture of about 1:1.8 to about 1:9.5. An emulsifier/saturated and unsaturated oil mixture weight ratio of approximately 1:3.11 is preferred.

Varnishes may also be present in the oil phase of the ink compositions of the present invention to keep the carbon black stable on the paper fibers, to control the viscosity of the ink composition, and to control its diffusion on paper. Varnishes useful in the ink compositions of the present invention include modified resins and phenolic resins, and a mixture of Gum Rosin (available from Glidden Co.) and Tufflo-2000, wherein the Gum Rosin is present in an amount of 20.6% by weight of the varnish composition. Vehicle #3 is preferred. The varnish is usually present in a weight ratio of varnish to unsaturated and unsaturated oil of about 1:2.3 to about 1:9.5. A varnish/saturated and unsaturated oil mixture weight ratio of approximately 1:4.7 is preferred.

Anionic emulsifier may also be present in the oil phase of the present invention to increase the stability of the ink composition, in cooperation with the non-ionic emulsifier, and to reduce the surface tension of the ink compositions of the present invention, thereby promoting drying of the ink composition after it is applied to the surface of paper. Useful anionic emulsifiers include amine dodecylbenzene sulfonate (available from Stepan Chemical Co.), and calcium dodecylbenzene sulfonate (available from Witco). Amine dodecylbenzene sulfonate is preferred. The anionic emulsifier is usually present in a weight ratio of anionic emulsifier to saturated and unsaturated oil mixture of about 1:3.5 to about 1:14. An anionic emulsifier/saturated and unsaturated oil mixture weight ratio of approximately 1:7 is preferred.

Viscosity adjusting agents may also be used in the oil phase of the ink compositions of the present invention. The viscosity adjusting agents are used to control the viscosity of the ink compositions of the present invention and to aid migration of the carbon black particles into the paper after application of the ink. Useful viscosity adjusting agents include mineral seal oil (available from Rensberger Oil Co.), and other low viscose napthenic oils. Mineral seal oil is preferred. The viscosity adjusting agent is usually present in a weight ratio of viscosity adjusting agent to saturated and unsaturated oil mixture of about 0:3 to about 1:1. A viscosity adjusting agent/saturated and unsaturated oil mixture weight ratio of approximately 1:7 is preferred.

General Considerations

The viscosity and surface tension of a given ink composition can be adjusted depending upon the specific components used therein, and such adjustment is within the skill of those in the art.

Printed images may be generated with the ink compositions of the present invention by incorporating the inks into a commercial digital duplicating machine, and causing the ink to contact a paper substrate via a cylinder which is in contact with the paper substrate. Suitable duplicating machines for employing the ink compositions of the present invention include commercially available duplicating machines, such as the PrinTech 6720, available from A. B. Dick Company.

The ink compositions of the present invention can be applied to a variety of paper substrates, and exhibit improved drying times over prior art compositions on all types of paper substrates.

The present invention is further illustrated by the following examples.

Comparative Example 1

Commercially available ink compositions were tested for drying time on both opaque mimeo paper (available from A. B. Dick Company) and Red Label 20 lb. (available from A. B. Dick Company). The test procedure was as follows: The inks were printed on the papers through stencils (#2360, available from A. B. Dick Company), which were prepared by electronic photo stencil maker model (#595, available from A. B. Dick Company) equipped with a stylus (#481, available from A. B. Dick Company), using a rubber roller. The printed images were then rubbed every 20 seconds with white Kleenex TM papers, and the drying time was determined as the time when the rubbing did not smear the images and did not result in the transfer of any carbon black to the Kleenex paper.

Three commercially available water-in-oil emulsion ink compositions were tested: ink having the trademark #3400, available from A. B. Dick Company; ink having the trademark 1-1035-C, available from Riso Kagaku Corporation; and ink having the trademark VT-Black-800, available from Ricoh. The results are set forth in Table 1.

TABLE 1

| | Drying Time (seconds) of Commercially Available Inks on Papers | | |
|---|---|---|---|
| | Ink | | |
| Paper | #3400 | 1-1035-C | VT-Black-800 |
| Opaque Mimeo | 210 | 190 | 150 |
| Red Label | 590 | 570 | 220 |

Comparative Example 2

Ink compositions were formulated without oxidation of the carbon black pigment contained therein and using China-wood oil as the unsaturated oil. These ink compositions were tested for drying time on both opaque mimeo and Red Label paper. The amount of the components of these inks was as follows:

TABLE 2

| Weight Ratio of Oil and Water Phases | |
|---|---|
| Component | Weight (grams) |
| Oil Phase | |
| China-wood oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Carbon black dispersion | 1.4 |
| Deionized water | 3.3 |
| Total | 9.8 |

The carbon black dispersions tested were Permablack 292, Permablack 1180, AJACK BLACK 3017, and AJACK BLACK 3018. The inks were applied and the drying time measured as is set forth in Comparative Example 1 above. The results are set forth in Table 3.

TABLE 3

| Drying Time (seconds) of Inks Without Oxided Carbon Black | | | |
|---|---|---|---|
| | | Concentration of China-wood Oil in Tufflo-2000 | |
| Paper | Carbon Black Dispersion | 0 Wt. % | 5 Wt. % |
| Opaque Mimeo | Permablack 292 | 170 | 30 |
| Red Label | | 390 | 940 |
| Opaque Mimeo | Permablack 1180 | 140 | — |
| Red Label | | 420 | — |
| Opaque Mimeo | AJACK BLACK 3017 | 60 | 40 |
| Red Label | | 300 | 260 |
| Opaque Mimeo | AJACK BLACK 3018 | 40 | 20 |
| Red Label | | 300 | 160 |

Comparative Example 3

Ink compositions were formulated without oxidation of the carbon black pigment and using aged linseed oil as the unsaturated oil. These compositions were then tested for drying time on both opaque mimeo and Red Label paper. The amount of the components of these inks was as follows:

TABLE 4

| Weight Ratio of Oil and Water Phases | |
|---|---|
| Component | Weight (grams) |
| Oil Phase | |
| Aged linseed oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Carbon black dispersion | 1.4 |
| Deionized water | 3.3 |
| Total | 9.8 |

The carbon black dispersions tested were Permablack 292, and AJACK BLACK 3018. The inks were applied and the drying times were measured as is set forth in Comparative Example 1 above. The results are shown in Table 5.

TABLE 5

| Drying Time (seconds) of Inks With Aged Linseed Oil | | | | |
|---|---|---|---|---|
| | | Concentration of Aged Linseed Oil In Tufflo-2000 | | |
| Paper | Carbon Black Dispersion | 0 Wt. % | 5 Wt. % | 20 wt. % |
| Opaque Mimeo | Permablack 292 | 170 | 500 | 230 |
| Red Label | | 390 | >1000 | 260 |
| Opaque Mimeo | AJACK BLACK 3018 | 40 | 40 | 20 |
| Red Label | | 300 | 300 | 180 |

EXAMPLE 1

Ink compositions were formulated where the carbon black pigment was oxidized with hydrogen peroxide while in the water phase. These compositions were tested for drying time on both opaque mimeo and Red Label paper. The amount of the components was as follows:

TABLE 6

| Weight Ratio of Oil and Water Phases | |
|---|---|
| Component | Weight (grams) |
| Oil Phase | |
| China-wood oil in Tufflo-2000 | 2.8 |

TABLE 6-continued

| Weight Ratio of Oil and Water Phases | |
|---|---|
| Component | Weight (grams) |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Permablack 292 | 1.4 |
| 30% hydrogen peroxide in deionized water | 3.3 |
| Total | 9.8 |

The water phase was prepared and aged for varying amounts of time before combination with the oil phase. The water phase was then combined with the oil phase wherein the weight ratio of the water phase to the saturated and unsaturated oil was 4.7:2.8 and shaken by hand for approximately 5–10 minutes, after which time the ink composition was allowed to stand at least 16 to 24 hours. The inks were then applied and the drying times measured as is set forth in Comparative Example 1. The results are shown in Table 7.

TABLE 7

| | Ink Drying Time (seconds) on Paper | | | | |
|---|---|---|---|---|---|
| | Concentration of China-wood Oil in Tufflo-2000 | | | | Aged Time |
| Paper | 0 Wt. % | 2 Wt. % | 5 Wt. % | 10 Wt. % | Of Water Phase |
| Opaque Mimeo | — | 60 | 120 | 60 | 1/6 hour |
| Red Label | — | 140 | 400 | 280 | |
| Opaque Mimeo | 60 | 20 | 10 | 10 | 3 days |
| Red Label | 340 | 160 | 100 | 100 | |
| Opaque Mimeo | — | 10 | 10 | 10 | 6 days |
| Red Label | — | 60 | 40 | 60 | |
| Opaque Mimeo | — | 40 | 40 | 30 | 10 days |
| Red Label | — | 120 | 120 | 60 | |

The results shown in Table 7 for the one-sixth hour aging time of the water phase is believed due to the fact that the short aging time of the carbon black resulted in a significant amount of hydrogen peroxide remaining in the water phase. This residual hydrogen peroxide then caused premature oxidation of the china-wood oil, which in turn caused an increase in ink viscosity and a decrease of reactivity of the china-wood oil after application to the substrate.

EXAMPLE 2

Ink compositions were formulated where the carbon black was oxidized by varying amounts of hydrogen peroxide. The concentration of hydrogen peroxide was measured based on the total weight of the water phase, without solids. As in Example 1, the water phase was aged for varying amounts of time before combination with the oil phase. The amount of the components was as follows:

TABLE 8

| Weight Ratio of Oil and Water Phases | |
|---|---|
| Component | Weight (grams) |
| Oil Phase | |
| China-wood oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Permablack 292 | 1.4 |

TABLE 8-continued

| Weight Ratio of Oil and Water Phases | |
|---|---|
| Component | Weight (grams) |
| hydrogen peroxide in deionized water | 3.3 |
| Total | 9.8 |

The water and oil phases were combined as in Example 1 above. The inks were applied and the drying times measures as is set forth in Comparative Example 1. The results are shown in Table 9.

TABLE 9

| | Drying Time (seconds) of Inks With Low $H_2O_2$ Concentrations | | | | |
|---|---|---|---|---|---|
| | | Concentration of China-wood oil in Tufflo-2000 | | | Aged Time |
| Paper | Conc. of $H_2O_2$* | 2 wt. % | 5 wt. % | 10 wt. % | Of Water Phase |
| Opaque Mimeo | 17.8 wt. % | — | 20 | — | 14 days |
| Red Label | | — | 80 | — | |
| Opaque Mimeo | 10 wt. % | — | 20 | — | 14 days |
| Red Label | | — | 80 | — | |
| Opaque Mimeo | 17.8 wt. % | — | 30 | — | 6 days |
| Red Label | | — | 100 | — | |
| Opaque Mimeo | 10 wt. % | — | 30 | — | 6 days |
| Red Label | | — | 100 | — | |
| Opaque Mimeo | 2.3 wt. % | 30 | 20 | 10 | 3 days |
| Red Label | | 180 | 100 | 60 | |

EXAMPLE 3

Example 2 was repeated, using Permablack 1180, AJACK BLACK 3017, and AJACK BLACK 3018 instead of Permablack 292, and a hydrogen peroxide concentration of 2.3% by weight of the water phase without solids. The amount of the various components used was the same as that in Example 2. The water phase was aged for 3 days prior to being combined with the oil phase. The results are shown in Table 10.

TABLE 10

| | Ink Drying Time (seconds) on Papers | | | |
|---|---|---|---|---|
| | Carbon Black | Concentration of China-wood Oil In Tufflo-2000 | | |
| Paper | Dispersion | 2 Wt. % | 5 Wt. % | 10 wt. % |
| Opaque Mimeo | Permablack 1180 | 20 | 30 | 30 |
| Red Label | | 100 | 60 | 80 |
| Opaque Mimeo | AJACK BLACK 3017 | 20 | 10 | 30 |
| Red Label | | 180 | 80 | 120 |
| Opaque Mimeo | AJACK BLACK 3018 | 20 | 20 | 40 |
| Red Label | | 60 | 70 | 70 |

EXAMPLE 4

Ink compositions were formulated where the carbon black was oxidized by a 3% solution of hydrogen peroxide in deionized water. The amount of hydrogen peroxide in the water phase was 2.3% by weight of the water phase without solids. The composition of the ink is set forth below:

TABLE 11

| Ratio of Oil and Water Phase Components | |
|---|---|
| Component | Weight (grams) |
| Oil Phase | |
| 10 wt. % China-wood oil in Tufflo-2000 | 2.8 |

TABLE 11-continued

Ratio of Oil and Water Phase Components

| Component | Weight (grams) |
|---|---|
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Carbon black dispersion | 1.4 |
| 3 wt. % of hydrogen peroxide in deionized water | 3.3 |
| Total | 9.8 |

The water phase was aged for varying amounts of time prior to combination with the oil phase, The ink compositions were printed on Red Label 20 Lb paper and the drying times measured as is shown in Comparative Example 1 above, The results are shown in Table 12.

TABLE 12

Drying Time (seconds) on Red Label Paper

| Preoxidation Time | Permablack 292 | Permablack 1180 | AJACK BLACK 3017 | AJACK BLACK 3018 |
|---|---|---|---|---|
| 0.5 hours | 260 | 160 | 260 | 260 |
| 1 day | 200 | 140 | 200 | 60 |
| 2 days | 100 | 100 | 100 | 80 |
| 3 days | 60 | 80 | 120 | 70 |

EXAMPLE 5

Ink compositions were formulated using aged linseed oil as the unsaturated oil, The concentration of hydrogen peroxide in the deionized water was set at 3% by weight or at 30% by weight, The composition of the ink is set forth below:

TABLE 13

Weight Ratio of Oil and Water Phases

| Component | Weight (grams) |
|---|---|
| Oil Phase | |
| Aged linseed oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Carbon black dispersion | 1.4 |
| Hydrogen peroxide in deionized water | 3.3 |
| Total | 9.8 |

The water phase was aged for varying times prior to combination with the oil phase. The ink compositions were printed on opaque mimeo and Red Label paper and the drying times were measured as shown in Comparative Example 1, The results are set forth in Table 14.

TABLE 14

Drying Time (seconds) of Inks With Aged Linseed Oil

| Paper | Carbon Black Dispersion | wt. % $H_2O_2$ | Concentration of Aged Linseed Oil In Tufflo-2000 | | | Aged Time of Water Phase |
|---|---|---|---|---|---|---|
| | | | 0 wt. % | 5 wt. % | 20 wt. % | |
| Opaque Mimeo | Permablack 292 | 30 | — | 30 | 10 | 14 days |
| Red Label | | | — | 160 | 120 | |
| Opaque Mimeo | AJACK BLACK 3018 | 3 | — | 20 | 20 | 3 days |
| Red Label | | | — | 120 | 160 | |

EXAMPLE 6

Ink compositions were formulated where the water phase was exposed to ozone for varying amounts of time to oxidize the carbon black. The composition of the ink is set forth below:

TABLE 15

Ratio of Oil and Water Phase Components

| Component | Weight (grams) |
|---|---|
| Oil Phase | |
| 10 wt. % China-wood oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Permablack 292 | 1.4 |
| Deionized water | 3.3 |
| Total | 9.8 |

The water phase components were mixed together, and the water phase was pumped using a magnetic drive centrifugal pump (Model 3-MDX, available from Little Giant Pump Co.) through a 5 gallon polyethylene container. Ozone was fed into the polyethylene container by an ozone generator (Aquazone Model 30V, available from Aquazone Products Co.). The water phase and oil phase were combined for 2–3 days after ozonization. The ink compositions were printed on Red Label 20 Lb paper and the drying times were measured as shown in Comparative Example 1. The results are set forth in Table 16.

TABLE 16

Evaluation of Preoxidation Time With Ozone

| Ozonization Time (hours) | Dry Time (seconds) on Red Label |
|---|---|
| 0 | 380 |
| 1 | 160 |
| 3 | 140 |
| 6 | 140 |
| 10 | 80 |
| 40 | 80 |

The drying time for the ink formulation where the carbon black was oxidized via ozone contact are comparable with those formulations oxidized by aqueous hydrogen peroxide. In this regard, see the first results for Permablack 292 in Table 12.

EXAMPLE 7

Ink compositions where the water phase was exposed to ozone for 10 hours were formulated with varying amounts of China-wood oil. The compositions of the ink is set forth below:

TABLE 17

Ratio of Oil and Water Phase Components

| Component | Weight (grams) |
|---|---|
| Oil Phase | |
| China-wood oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| AJACK BLACK 3018 | 1.4 |
| Deionized water | 3.3 |
| Total | 9.8 |

The water phase was contacted with ozone as in Example 6. The ink compositions were printed on Red Label 20 Lb paper and the drying times were measured as shown in Comparative Example 1. The results are shown in Table 18.

TABLE 18

Evaluation of Dry Time (seconds)

| Ozonization Time | Concentration of China-wood Oil in Tufflo-2000 | | | |
|---|---|---|---|---|
| | 0 wt. % | 5 wt. % | 10 wt. % | 20 wt. % |
| 10 hours | 240 | 180 | 100 | 80 |

From the data in Table 18 it is also seen that a concentration of china-wood oil greater than 5 weight percent in this particular system is preferred to achieve the full benefits of the present invention.

EXAMPLE 8

An Ink composition was formulated having the following components:

TABLE 19

Ratio of Oil and Water Phase Components

| Component | Weight (grams) |
|---|---|
| Oil Phase | |
| 5 wt. % China-wood oil in Tufflo-2000 | 2.8 |
| Sorbitan monooleate | 0.9 |
| Vehicle #3 | 0.6 |
| Amine dodecylbenzene sulfonate | 0.4 |
| Mineral seal oil | 0.4 |
| Water Phase | |
| Permablack 292 | 1.4 |
| 30% hydrogen peroxide in water | 3.3 |
| Total | 9.8 |

The water phase was aged for three days and then combined with the oil phase. The ink composition was exposed to air on a glass plate for over one month, yet still retained its fluid nature.

I claim:

1. A water-in-oil emulsion duplicating ink comprising a water phase comprising an aqueous dispersion of oxidized carbon black and an oil phase comprising a saturated oil and an unsaturated oil.

2. The ink of claim 1, wherein the carbon black is oxidized as an aqueous dispersion and maintained in an aqueous medium.

3. The ink of claim 1, wherein the weight ratio of the water phase to the saturated and unsaturated oil is 4.7:2.8.

4. The ink of claim 1, wherein the oil phase further comprises a non-ionic emulsifier.

5. The ink of claim 1, wherein the oil phase further comprises an anionic emulsifier.

6. The ink of claim 1, wherein the oil phase further comprises at least one viscosity adjusting agent.

7. The ink of claim 1, wherein the oil phase further comprises a varnish.

8. The ink of claim 1, wherein the oil phase further comprises a non-ionic emulsifier, an anionic emulsifier, at least one viscosity adjusting agent, and a varnish.

9. A method of preparing a water-in-oil emulsifying ink comprising preparing a water phase by mixing an aqueous carbon black dispersion with an aqueous hydrogen peroxide solution in an amount sufficient to effect substantial oxidation of the carbon black surfaces, allowing the hydrogen peroxide to oxidize the carbon black for at least one day, and combining the water phase with an oil phase comprising a saturated oil and an unsaturated oil.

10. The method of claim 9, wherein the weight ratio of the water phase to the saturated and unsaturated oil is 4.7:2.8.

11. The method of claim 9, wherein the oil phase further comprises a non-ionic emulsifier.

12. The method of claim 9, wherein the oil phase further comprises an anionic emulsifier.

13. The method of claim 9, wherein the oil phase further comprises at least one viscosity adjusting agent.

14. The method of claim 9, wherein the oil phase further comprises a varnish.

15. The method of claim 9, wherein the oil phase further comprises a non-ionic emulsifier, an anionic emulsifier, at least one viscosity adjusting agent, and a varnish.

16. A method of preparing a water-in-oil emulsifying ink comprising preparing a water phase by mixing an aqueous carbon black dispersion with deionized water, contacting the water phase with ozone in an amount sufficient to effect substantial oxidation of the carbon black surfaces, for a period of from about one hour to about forty hours, and combining the water phase with an oil phase comprising a saturated oil and an unsaturated oil.

17. The method of claim 16, wherein the weight ratio of the water phase to the saturated and unsaturated oil is 4.7:2.8.

18. The method of claim 16, wherein the oil phase further comprises a non-ionic emulsifier.

19. The method of claim 16, wherein the oil phase further comprises an anionic emulsifier.

20. The method of claim 16, wherein the oil phase further comprises at least one viscosity adjusting agent.

21. The method of claim 16, wherein the oil phase further comprises a varnish.

22. The method of claim 16, wherein the oil phase further comprises a non-ionic emulsifier, an anionic emulsifier, at least one viscosity adjusting agent, and a varnish.

* * * * *